United States Patent [19]

Gellert

[11] Patent Number: 4,795,338

[45] Date of Patent: Jan. 3, 1989

[54] MOUNTING FOR INJECTION MOLDING NOZZLE

[76] Inventor: Jobst U. Gellert, 7A Prince St., Georgetown, Ontario, Canada, L7G 2X1

[21] Appl. No.: 155,988

[22] Filed: Feb. 16, 1988

[51] Int. Cl.$^4$ ............................................. B29C 45/20
[52] U.S. Cl. .................................. 425/549; 264/328.15
[58] Field of Search ............... 425/547, 549, 567, 568; 264/328.14, 328.15

[56] References Cited

U.S. PATENT DOCUMENTS 4,238,671 12/1980 Gellert ................................. 219/421
4,557,685 12/1985 Gellert ................................. 425/549

OTHER PUBLICATIONS

Mold-Masters Limited brochure entitled "Masters-Shot Nozzles", Nov. 1982.

Primary Examiner—Jay H. Woo
Assistant Examiner—Timothy W. Heitbrink
Attorney, Agent, or Firm—Riches, McKenzie & Herbert

[57] ABSTRACT

This invention relates to a single nozzle sprue gated injection molding system which has been improved to reduce heat loss from the heated nozzle to the surrounding mold. The nozzle is held securely in place by a collar which engages a thin flanged portion which extends outwardly from a backplate which is bolted to the rear end of the nozzle. A deep circumferential groove in the rear face of the retaining collar forms a thin wall portion against which the thin flanged portion abuts. Similarly, a deep groove in the face of the cavity plate forms a thin wall portion against which the sealing and locating flange abuts to further reduce heat loss.

5 Claims, 1 Drawing Sheet

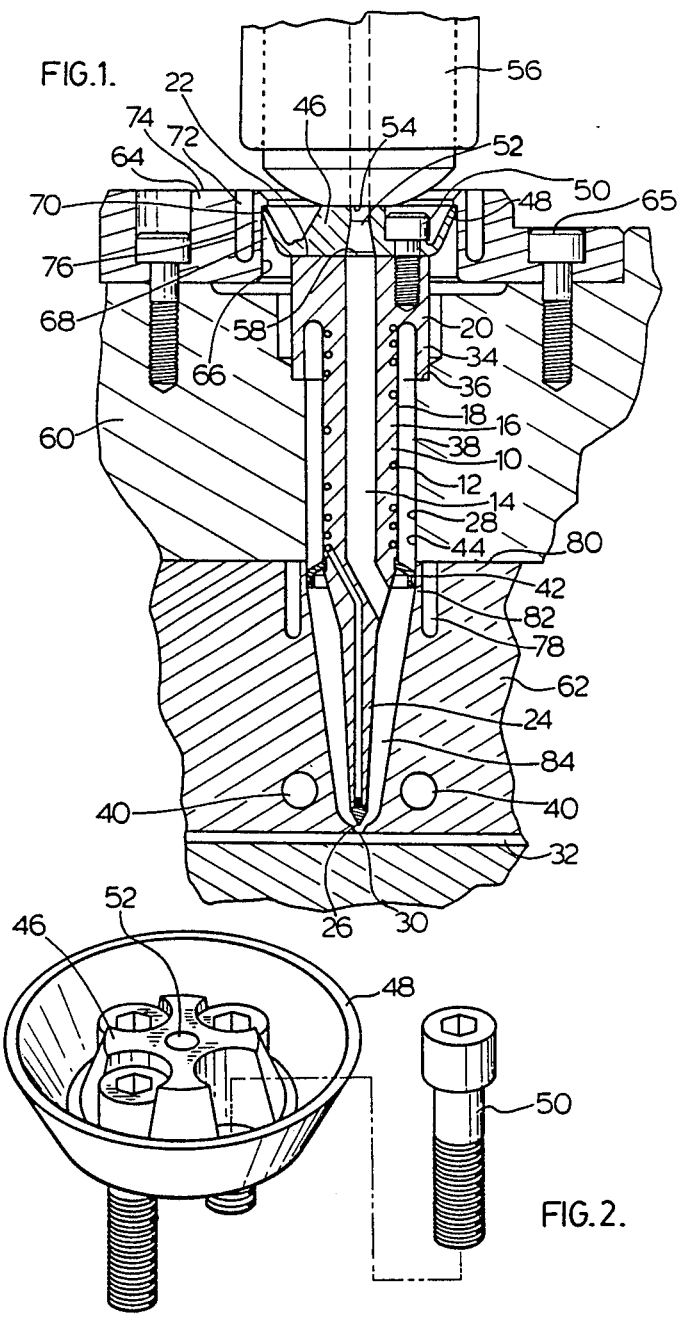

MOUNTING FOR INJECTION MOLDING NOZZLE

BACKGROUND OF THE INVENTION

This invention relates to injection molding and more particularly to a single nozzle sprue gated injection molding system wherein there is reduced heat loss from the heated nozzle to the surrounding mold.

In this type of system, the heated nozzle is seated in a well in the cooled mold. As shown for instance, in the applicant's U.S. Pat. No. 4,557,685 entitled "Heated nozzle for Injection Molding Apparatus" which issued December 10, 1985, the nozzle has an insulation bushing which seats against a shoulder to locate the nozzle with an insulative air space between it and the surrounding mold, the applicant's U.S. Pat. No. 4,238,671 entitled "Spruce Bushing with Cast in Heater Element" which issued Dec. 9, 1980 shows the nozzle being held in place by pressure from the molding machine nozzle. However, it is preferable to hold the nozzle in place in the well using a retaining collar bolted to the mold as shown in FIG. 15 of Mold-Masters Limited brochure A-MS-058-1182 entitled "Masters-Shot Nozzles" dated November 1982.

As is well know, it is critical to the successful operation of the system that the temperature of the melt be maintained within a predetermined narrow temperature range as it flows through the nozzle. However, it has been found that the previous nozzles of this type suffer greater temperature drop at the end than in the middle which makes a uniform temperature difficult to achieve. One attempt to deal with this problem is to increase the pitch of the helical heating element in the middle as shown, for instance, in the applicant's Canadian patent application Ser. No. 549,519 filed Oct. 16, 1987 entitled "Injection Molding Nozzle with Resilient Sealing and Locating Flange." Canadian application Ser. No. 549,519 also discloses a sealing and locating flange which extends from the nozzle across the insulative air space and abuts against the surrounding inner surface of the well. As will be appreciated, each of the insulation bushing, retaining collar and sealing and locating flange which accurately locate the nozzle and hold it in place necessarily result in some heat loss from the area which compounds the uniform temperature problem.

The applicant's Canadian patent application Ser. No. 520,519 filed Oct. 15, 1986 entitled "Sealing and Retaining Bushing for Injection Molding" shows a bushing with a flanged outer portion which extends between the manifold and the back plate to hold the manifold in place. However, this is a multi-cavity valve gated system and the bushing also seals against leakage around the reciprocating valve pin which extends through it.

SUMMARY OF THE INVENTION

Accordingly, it is an object of the invention to at least partially overcome the disadvantages of the prior art by providing a single nozzle system wherein a backplate is mounted on the rear of the nozzle to hold the nozzle in place with reduce heat loss.

To this end, in one of its aspects, the invention provides an injection molding system having an elongated heated nozzle seated in a well in a cooled mold with minimal contact bridging an insulative air space provided between the heated nozzle and the surrounding cooled mold, the nozzle having a forward end, a rear end and a melt bore extending from a central inlet at the rear end to convey pressurized melt from a molding machine nozzle towards at least one gate extending from the well to a cavity, and a retaining collar have a forward and a rear face and a central opening therethrough secured to the mold to hold the nozzle securely in place, the improvement wherein a backplate having a bore therethrough is mounted on the rear end of the nozzle with the bore extending into alignment with the central inlet to the melt bore of the nozzle to receive pressurized melt from an outlet from the molding machine nozzle, the backplate and the rear end of the nozzle are located in the central opening through the retaining collar with an insulative air space provided between the nozzle and the surrounding retaining collar, the backplate has a relatively thin flanged portion which extends outwardly and rearwardly across the insulative air space to engage the retaining collar, whereby the retaining collar holds the backplate and the nozzle securely in place.

Further objects and advantages of the invention will appear from the following description taken together with the accompanying drawings.

BRIEF DESCRIPTION OF THE DRAWINGS

FIG. 1 is a sectional view of a portion of a single nozzle injection molding system according to a preferred embodiment of the invention, and FIG. 2 is an isometric view of the backplate shown mounted on the rear end of the nozzle in FIG. 1.

DETAILED DESCRIPTION OF THE DRAWINGS

Reference is made to FIG. 1 which shows a single nozzle spruce gated injection molding system according to a preferred embodiment of the invention. The elongated nozzle 10 has a brazed in electrical heating element 12 has a melt bore 14 as described in the applicant's Canadian patent application Ser. No. 549,517 filed Oct. 16, 1987 entitled "Injection Molding Nozzle Having Grounded Heating Element Brazed into Pointed Tip." The nozzle 10 has a central portion 16 with a generally cylindrical outer surface 18 extending between a collar portion 20 adjacent the rear end 22 and a tapered nose portion 24 extending to the forward end 26. The nozzle 10 is seated in a well 28 in the mold with the forward end 26 in alignment with a gate 30 extending from the well 28 to a cavity 32. The collar portion 20 forms an insulation bushing 34 which seats against a shoulder 36 to support the nozzle 10 in a position wherein an insulative air space 38 is provided between the heated nozzle 10 and the surrounding mold which is cooled by water flowing through cooling conduits 40. The nozzle 10 also has a circumferential sealing and locating flange 42 which extends outwardly between the central portion 16 and the nose portion 24 as described in the applicant's Canadian patent application No. 549,519, referred to above. This flange 42 extends across the air space 38 and abuts against the inner surface 44 of the well 28 to provide a seal against the leakage of pressurized melt and to accurately locate the forward end 26 in the gate 30.

As clearly shown in FIG. 2, a backplate 46 having a relatively thin flanged portion 48 is secured to the rear end 22 of the nozzle 10 by bolts 50. The backplate has a central bore 52 which is in alignment with an outlet 54 from the molding machine nozzle 56 and in inlet 58 to the melt bore 14 through the nozzle 10. As is well known, the mold can be made with a variety of different components and plates depending upon the desired shape of the cavity 32. In the present case, the mold has a support plate 60 which is secured between the cavity plate 62 and a circular retaining collar 64 which is secured to it by bolts 65 in a conventional manner. As can be seen, the retaining collar 64 has a central opening 66 therethrough which receives the rear end 22 of the nozzle 10 and the backplate 46 bolted to it. The opening 66 is sufficiently larger in diameter than the rear end 22 of the nozzle 10 to provide an insulative air space 68 between them. The flanged portion 48 of the backplate 46 extends outwardly and rearwardly across the air space 68 and abuts against a shoulder 70 which extends inwardly from the retaining collar. Thus, when the system is assembled and the collar 64 is bolted tightly into the position shown, it engages the flanged portion 48 of the backplate 46 and holds the nozzle 10 securely in place in the well 28. Although the backplate 46 and the retaining collar are made of steel, it will be appreciated that the relatively thin shape of the flanged portion 48 of the backplate 46 results in substantially less heat loss than if the retaining collar 64 abuts directly against the rear end 22 of the nozzle.

In order to further reduce heat loss from the heated nozzle 10, a deep circumferential groove 72 is machined in the rear face 74 of the retaining collar 64. This provides a thin wall portion 76 having the shoulder 70 against which the flanged portion 48 of the backplate 46 abuts. Similarly, a deep circumferential groove 78 is machined in the face 80 of the cavity plate 62 to provide a thin wall portion 82 against which the sealing and locating flange 42 abuts. This reduces the heat loss from the heated nozzle 10 through the flange.

In use, after the injection molding system has been assembled s shown and described above, electrical power is applied to the heating element 12 to heat the nozzle 10 to a predetermined operating temperature. Pressurized melt is then introduced from the outlet 54 of the molding machine nozzle 56 through the central bore 52 of the backplate and into the melt bore 14 of the nozzle 10. The pressurized melt flows through the nozzle 10 into a space 84 surrounding the heated nose portion 24 of the nozzle 10 and then through the gate 30 into the cavity 32. The space 84 remains filled with melt, a portion of which adjacent the cooled cavity plate 62, and the sealing and locating flange 42 prevents it escaping into the insulative air space 38. After the cavities are filled, injection pressure is held momentarily to pack and then released. After a short cooling period, the mold is opened to eject the molded products. After, ejection, the mold is closed and injection pressure is reapplied to refill the cavity 32. This cycle is continuously repeated with a frequency dependent on the size and shape of the cavity and the type of material being molded.

While the description of the system and its use have been given with respect to a preferred embodiment, it is not to be construed in a limiting sense. Variation and modifications will occur to those skilled in the art. For instance, to further reduce heat loss, the thin flanged portion 48 of the backplate 46 can consist of a number of spaced fingers extending out to engage the surrounding retaining collar 64. Reference is made to the appended claims for a definition of the invention.

What I claim is:

1. In an injection molding system having an elongated heated nozzle seated in a well in a cooled mold with minimal contact bridging an insulative air space provided between the heated nozzle and the surrounding cooled mold, the nozzle having a forward end, a rear end and a melt bore extending from a central inlet at the rear end to convey pressurized melt from a molding machine nozzle towards at least one gate extending from the well to a cavity, and a retaining collar having a forward and a rear face and a central opening therethrough secured to the mold to hold the nozzle securely in place, the improvement wherein a backplate having a bore therethrough is mounted on the rear end of the nozzle with the bore of the back plate extending into alignment with the central inlet to the melt bore of the nozzle to receive pressurized melt from an outlet from the molding machine nozzle, the backplate and the rear end of the nozzle are located in the central opening through the retaining collar with an insulative air space provided between the nozzle and the surrounding retaining collar, the backplate having a relatively thin flanged portion which extends outwardly and rearwardly across the insulative air space to engage the retaining collar, whereby the retaining collar holds the backplate and the nozzle securely in place.

2. An injection molding system as claimed in claim 1 wherein the retaining collar has an inwardly extending shoulder which engages the flanged portion of the backplate.

3. An injection molding system as claimed in claim 2 wherein the backplate is bolted to the rear end of the nozzle.

4. An injection molding system as claimed in claim 1 wherein a deep circumferential groove extends from the rear face of the retaining collar to provide a relatively thin wall portion against which the flanged portion of the backplate abuts.

5. An injection molding system as claimed in claim 1 wherein the nozzle has a central portion with a generally cylindrical outer surface extending between a collar portion adjacent the rear end and a nose portion adjacent the forward end, the nozzle having a circumferential sealing and locating flange between the central portion and the nose portion, the flange extending outwardly across the insulative air space to contact the surrounding mold, the mold having a cavity plate with a deep circumferential groove extending to provide a relatively thin wall portion against which the sealing and locating flange abuts.

* * * * *